United States Patent Office 3,312,559
Patented Apr. 4, 1967

3,312,559
AMYLOSIC MATERIAL PLASTICIZED WITH A MIXTURE OF TRIETHANOLAMINE AND AN ALPHA, BETA, OMEGA TRIHYDRIC ALCOHOL
Austin H. Young, Decatur, Ill., assignor to A. E. Staley Manufacturing Company, Decatur, Ill., a corporation of Delaware
No Drawing. Filed Feb. 18, 1964, Ser. No. 345,593
18 Claims. (Cl. 106—213)

This invention relates to amylose plasticized with a composition comprising triethanol amine and a straight chain four- to six-carbon atom alpha, beta, omega trihydric alcohol.

For years amylose films have been studied from a more or less academic point of view since amylose was not commercially available. Now that amylose has become available in sizeable quantities research on amylose films has increased. One of the major problems, which has slowed the commercialization of amylose films, is that the flexibility and elongation of amylose films is dependent upon the water content of the amylose film. At low relative humidity, water is lost by evaporation, and the film becomes extremely brittle and its elongation decreases. Even at 50% relative humidity the film has a low percent elongation and poor flexibility.

Various attempts to find plasticizers for amylose have centered upon humectants, which would retain water at low relative humidity. Glycerol has generally been considered the best amylose plasticizer. However, glycerol is sadly deficient. At low humidity, glycerol-plasticized amylose films have about the same elastic modulus and percent elongation as unplasticized amylose films. At about 50% relative humidity, the glycerol-plasticized amylose films have an initial percent elongation and elastic modulus that are markedly better than those of unplasticized amylose. However, the improvements imparted by humectants such as glycerol are only temporary. On aging the elastic modulus of amylose films plasticized with glycerol increases and percent elongation decreases to the point where the plasticized film is not appreciably different from the unplasticized film. While we have succeeded in reducing the embrittlement due to aging of glycerol-plasticized amylose films by casting amylose films in the manner described in application Serial No. 336,059, filed January 6, 1964, it is desirable to provide an amylose plasticizer whose plasticizing effect is not dependent on the method of preparing the amylose film.

The object of this invention is to provide improved plasticizers for shaped amylose objects, such as amylose films.

I have now found that a composition comprising triethanol amine and a straight chain 4- to 6-carbon atom alpha, beta, omega trihydric alcohol, especially 1,2,6-hexanetriol, is an excellent plasticizer for shaped amylose objects, such as films. Mixtures of triethanol amine and 1,2,6-hexanetriol have been extremely effective in reducing the elastic modulus of amylose films and increasing the percent elongation of amylose films at both low relative humidity and 50% relative humidity. Further, amylose films plasticized with triethanol amine and 1,2,6-hexanetriol do not become embrittled, when aged for several months, as glycerol-plasticized amylose films do.

The straight chain 4- to 6-carbon atom alpha, beta, omega trihydric alcohols can be represented by the formula:

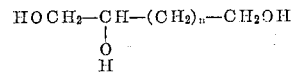

wherein $n$ is a number from 1 to 3. The compounds represented by this formula are 1,2,4-butanetriol, 1,2,5-pentanetriol and 1,2,6-hexanetriol. 1,2,6-hexanetriol is preferred because of its effectiveness at low humidity when used in conjunction with triethanol amine. It is believed that the effectiveness of 1,2,6-hexanetriol at low humidity is due to its relatively high hydroxyl concentration and to its high carbon to oxygen ratio of 2:1. My studies have shown that as $n$ decreases from 3 to 1 the effectiveness of the plasticizer system decreases.

The weight ratio of amylose plasticizer (trihydric alcohol and triethanol amine) to amylose (dry solids basis) can range from 5:95 to 60:40 when the trihydric alcohol-triethanol amine composition is the sole plasticizer. However, for high elongation at low relative humidity, the trihydric alcohol-triethanol amine plasticizer should comprise at least 22% and preferably in excess of 24–25% by weight of the amylose composition. Generally, it is not economically attractive to have the trihydric alcohol-triethanol amine plasticizer comprise more than 30% by weight of the amylose, since the additional cost of plasticizer is not compensated for by markedly better properties. In other words, optimum plasticization at the lowest cost is attained when the plasticizer of this invention comprises from about 24–30% of the amylose composition.

The weight ratio of trihydric alcohol to triethanol amine can be varied greatly from about 1:19 to 19:1. For high elongation at low humidity, when the trihydric alcohol and triethanol amine comprises about 24–25% of the amylose film, it is preferable that the weight ratio of trihydric alcohol to triethanol amine be close to 3:1. However, when the trihydric alcohol and triethanol amine comprise about 28% by weight or more of the amylose film, high elongation at low humidity has been attained using a trihydric alcohol to triethanol amine weight ratio of from about 8:1 to 1:3.

For the purpose of this invention, the term "amylose" refers to the amylose resulting from the separation of the amylose and amylopectin components of starch, or the whole starch which is composed of at least 50% amylose. Commercially available sources of amylose include "Nepol" amylose (the amylose fraction of corn starch), "Superlose" (the amylose fraction of potato starch), "Amylomaize" or "Amylon" (high-amylose corn starch containing approximately 54% amylose), "Amylon VII" (high-amylose corn starch containing up to 70% amylose), etc. Amylose films, fibers and tubes of high-amylose corn starch can be simulated by mixing corresponding concentrations of separated amylose with separated amylopectin. Preferably, however, the amylopectin content of the amylose is less than 20% by weight. In general, the higher the concentartion of amylose the better the tensile strength and flexibility of the shaped object. Various derivatives of amylose (amylose acetate, hydroxyethyl amylose and hydroxypropyl amylose) such as those described in U.S. Patent 3,038,895 can also be employed. Preferably, the amylose derivative can be dissolved in water and has a degree of substitution less than one.

Amylose films can be prepared by any of the prior art techniques, such as those described in any of U.S. Patents 2,603,723 to Wolff et al., 2,903,336 to Hiemstra et al., 2,973,243 to Kudera, 3,030,667 to Kunz, etc. In these processes the amylose plasticizer (in either the dry form or dissolved in water) is added to a suitable aqueous solution of amylose, dissolved, for example, in aqueous alkali, in hot water at essentially neutral pH, etc. The amylose solution is then cast on a suitable substrate, such as a moving belt, or extruded into a coagulating (acidic or salt) bath. In this way the amylose film is recovered from the aqueous solution by the precipitation of the amylose film from the solvent or by evaporation of the solvent during drying. If desired, the plasticizer can be added to the amylose prior to the dissolution of the amylose.

These techniques can be employed to prepare self-supporting films which are large in two dimensions and small in the third dimension, i.e. two dimensions are at least 100 times larger than the third dimension. The prepared films can also be laminated to a suitable base or the film can be cast or otherwise applied directly on a suitable substrate, e.g. cellulose (cellophane, paper, cotton or rayon fabrics), metal, etc. A particularly useful method of coating paper with a grease-resistant amylose layer is described in detail in commonly assigned application Serial No. 296,660, filed July 22, 1963.

Amylose film can also be prepared by extruding superficially dry amylose, trihydric alcohol and triethanol amine. By superficially dry, I mean that essentially all of the amylose plasticizer has been absorbed by or blended with the amylose prior to the extrusion step. This technique is described in detail in commonly assigned application Serial No. 244,127, filed December 12, 1962.

The following examples are merely illustrative and are not to be construed as limiting the scope of my invention. All of the data in the examples is an average of five determinations.

*Example I*

An aqueous solution of undefatted corn amylose was prepared by pumping an aqueous slurry of 6.435 parts by weight (d.s.b.) undefatted corn amylose, 0.715 parts by weight (d.s.b.) undefatted corn amylopectin, 0.71 parts by weight triethanol amine, 2.14 parts by weight 1,2,6-hexanetriol in 64.35 parts by weight water through a 35 foot long, 0.120″ i.d. (inside diameter) coil of tubing heated to 150° C. and having a dwell time of 2 minutes. The aqueous solution was cooled to 95° C. and placed in a preheated Dewar flask. The solution was stirred for 60 seconds and then cast on a lecithin-coated glass plate at 30° C. using a doctor blade preheated to 95° C. The film gelled rapidly as it cooled to room temperature. The same technique was repeated except that the 1,2,6-hexanetriol was replaced by the same concentration of glycerol, sorbitol, 1,2-propanediol, trimethylol propane and diethylene glycol. Each film was stripped from the glass plate and stored at 23° C. at either 23% relative humidity or 50% relative humidity. After 1 week the percent elongation and elastic modulus of the films was determined. The results are set forth below in Table I where R.H. stands for relative humidity.

TABLE I

| Polyhydric Alcohol Plasticizer Used With Triethanol Amine | Film Thickness in Mils | Elastic Modulus in p.s.i. | | Percent Elongation | |
|---|---|---|---|---|---|
| | | At 23% R.H. | At 50% R.H. | At 23% R.H. | At 50% R.H. |
| 1,2,6-hexanetriol | 2.0 | 211,000 | 99,200 | 21.8 | 35 |
| Glycerol | 2.2 | 300,000 | 52,600 | 7.6 | 28 |
| Sorbitol | 2.6 | 307,000 | 126,000 | 3 | 48 |
| 1,2-propanediol | 1.9 | 490,000 | 170,000 | 1.3 | 9 |
| Trimethylol propane | 2.1 | 263,000 | 134,000 | 2.3 | 39 |
| Diethylene glycol | 2.3 | 392,000 | 230,000 | 1.9 | 19 |

The above data illustrates that the combination of triethanol amine and a straight chain 4- to 6-carbon atom alpha, beta, omega trihydric alcohol is a markedly superior low humidity plasticizer for amylose.

*Example II*

The method described in Example I was repeated using various levels of 1,2,6-hexanetriol and triethanol amine except that the triethanol amine and 1,2,6-hexanetriol were added to the amylose composition after the amylose was dissolved in water. The results are set forth below in Table II.

Table II

| Weight Percent of Film Which is 1,2,6-hexanetriol | Weight Percent of Film Which is Triethanol Amine | Weight Percent of Film Which is Plasticizer | Elastic Modulus in p.s.i. | | Percent Elongation | |
|---|---|---|---|---|---|---|
| | | | At 23% R.H. | At 50% R.H. | At 23% R.H. | At 50% R.H. |
| 12.5 | 4.2 | 16.7 | 439,000 | 220,000 | 3 | 25 |
| 14.5 | 4.8 | 19.3 | 339,000 | 205,000 | 5 | 55 |
| 12.5 | 8.0 | 20.5 | 393,000 | 153,000 | 3 | 61 |
| 16.5 | 5.5 | 22.0 | 338,000 | 170,000 | 9 | 57 |
| 15.9 | 7.7 | 23.6 | 314,000 | 122,000 | 8 | 73 |
| 22.7 | 1.6 | 24.3 | 323,000 | 124,000 | 7 | 71 |
| 18.2 | 6.2 | 24.4 | 302,000 | 133,000 | 12 | 64 |
| 19.9 | 6.6 | 26.5 | 272,000 | 107,000 | 27 | 60 |
| 19.4 | 7.3 | 26.7 | 346,000 | 121,000 | 20 | 48 |
| 24.8 | 3.5 | 28.3 | 182,000 | 91,700 | 21 | 82 |
| 7.1 | 21.2 | 28.3 | 158,000 | 76,200 | 44 | 82 |
| 14.2 | 14.2 | 28.4 | 150,000 | 78,900 | 38 | 77 |

The above data illustrates that mixtures of triethanol amine and 1,2,6-hexanetriol are effective in almost any proportion as amylose film plasticizers at 50% R.H. However, for high elongation at low humidity, it is advisable to use in excess of 24–25% by weight of the two plasticizers.

*Example III*

The method described in Example II was used to prepare an amylose film composed of 59.9% by weight undefatted corn amylose, 6.7% by weight undefatted corn amylopectin, 7.3% by weight polyvinyl alcohol (Elvanol 72–60), 19.5% by weight 1,2,6-hexanetriol and 6.6% by weight triethanol amine. The polyvinyl alcohol was contained in the Dewar flask along with the 1,2,6-hexanetriol and triethanol amine. After one week at 23° C. and 50% relative humidity the film had an elastic modulus of 81,200 p.s.i. and 73% elongation. After one week at 23° C. and 23% relative humidity the film had an elastic modulus of 232,000 p.s.i. and 23% elongation.

*Example IV*

An aqueous solution of defatted corn amylose was prepared by pumping an aqueous slurry of 12 parts by weight corn amylose, 3.51 parts by weight 1,2,6-hexanetriol, 1.17 parts by weight triethanol amine in 88 parts by weight water through a 35 foot long, .120″ i.d. coil of tubing heated to 150° C. and having a dwell time of 2 minutes. The aqueous solution was cooled to 95° C. and placed in a preheated Dewar flask (95° C.). One portion of the solution was cast on a lecithin-coated plate at 96° C. using a doctor blade preheated to 90° C. The plate was maintained at 96° C. for an additional seven minutes to dry it, and then the film was stripped from the glass plate and stored at 23° C. and 50% relative humidity.

The second portion of the solution was cast on a lecithin-coated plate at 25° C. using a doctor blade preheated to 90° C. After drying overnight at room temperature, the film was stripped from the glass plate and stored at 23° C. and 50% relative humidity. Both films were tough, sparkling clear and had high lustre.

The elastic modulus and percent elongation of each film was determined after 1 week and after 5 months. The results are set forth below in Table III.

Table III

| Casting and Drying Temperature, °C. | Film Thickness in Mils | Elastic Modulus in p.s.i., 50% R.H. at 23° C. | | Percent Elongation, 50% R.H. at 23° C. | |
|---|---|---|---|---|---|
| | | 1 week | 5 months | 1 week | 5 months |
| 96 | 3.22 | 99,200 | 103,000 | 25 | 44 |
| 25 | 2.58 | 109,000 | 171,000 | 41 | 31 |

The above data illustrates that the plasticizing effect of the plasticizer system of this invention is relatively independent of the age of the amylose film and the method of preparation.

When this example was repeated using a dissolution temperature of 160° C. the amylose films tended to be slightly yellow to brown due to the decomposition of the triethanol amine. Accordingly, when the amylose is dissolved at about 160° C. or higher it is advisable to dissolve the amylose in the absence of the triethanol amine and then add the triethanol amine to the amylose solution.

While this invention is principally directed to plasticizing amylose with the described mixed plasticizer system, the mixed plasticizer system can also be used as solvents, swelling agents or plasticizer for starch. The term "starch" is used in its generic sense to be inclusive of any native starch, modified native starch or derivatized native starch. Corn starch, high amylose corn starch, tapioca starch, wheat starch, rye starch, potato starch, sago starch, waxy corn starch and the amylose and amylopectin fractions therefrom are representative of the various native starches and starches therefrom that can be used with mixtures of triethanol amine and the trihydric alcohol of this invention. Any of these starches may be modified by enzyme treatment, by oxidation with alkaline hypochlorite or by hydrolysis with acid, for example, or derivatized by treatment with ethylene oxide, propylene oxide, acetic anhydride, vinyl acetate, chloroacetic acid, epichlorohydrin, phosphorus oxychloride, etc. Mixtures of triethanol amine and the trihydric alcohol can be used in a concentration as low as 1 part by weight per each 19 parts by weight starch in plasticizing starch or in a concentration of 10 to 20 parts by weight or more per each part by weight starch, when employed as a solvent for starch. The mixture of triethanol amine and trihydric alcohol can also be used as swelling agents in the extrusion pasting of starch described in commonly assigned application Serial No. 100,354, filed April 3, 1961 and now U.S. Patent No. 3,137,592.

Since many embodiments of this invention may be made and since many changes may be made in the embodiments described, the foregoing is to be interpreted as illustrative only and my invention is defined by the claims appended hereafter.

I claim:

1. A composition comprising an amylosic material containing at least 50% by weight amylose wherein the amylose portion of said amylosic material is present in the form of material selected from the group consisting of the separated amylose fraction of whole starch, whole starch containing at least 50% by weight amylose and mixtures thereof plasticized with a plasticizing concentration of triethanol amine and a straight chain 4- to 6-carbon atom alpha, beta, omega trihydric alcohol having the structural formula:

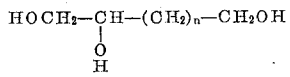

wherein $n$ is a number from 1 to 3.

2. A composition comprising an amylosic material containing at least 50% by weight amylose wherein the amylose portion of said amylosic material is present in the form of a material selected from the group consisting of the separated amylose fraction of whole starch, whole starch containing at least 50% by weight amylose and mixtures thereof plasticized with a plasticizing concentration of triethanol amine and 1,2,6-hexanetriol.

3. A continuous amylosic film comprising an amylosic material containing at least 50% by weight amylose wherein the amylose portion of said amylosic material is present in the form of material selected from the group consisting of the separated amylose fraction of whole starch, whole starch containing at least 50% by weight amylose and mixtures thereof plasticized with a plasticizing concentration of triethanol amine and a straight chain 4- to 6-carbon atom alpha, beta, omega trihydric alcohol having the structural formula:

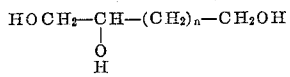

wherein $n$ is a number from 1 to 3.

4. A continuous amylosic film comprising an amylosic material containing at least 50% by weight amylose wherein the amylose portion of said amylosic material is present in the form of a material selected from the group consisting of the separated amylose fraction of whole starch, whole starch containing at least 50% by weight amylose and mixtures thereof plasticized with a plasticizing concentration of triethanol amine and 1,2,6-hexanetriol.

5. A composition comprising starch and a mixture of triethanol amine and a straight chain 4- to 6-carbon atom alpha, beta, omega trihydric alcohol having the structural formula:

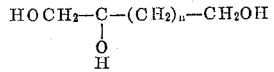

wherein $n$ is a number from 1 to 3 and the weight ratio of starch to mixture of triethanol amine and trihydric alcohol is from 19:1 to 1:20.

6. A composition comprising starch and a mixture of triethanol amine and 1,2,6-hexanetriol wherein the weight ratio of starch to mixture of triethanol amine and trihydric alcohol is from 19:1 to 1:20.

7. The composition of claim 1, wherein the weight ratio of plasticizer to amylosic material ranges from 5:95 to 60:40.

8. The composition of claim 2, wherein the weight ratio of plasticizer to amylosic material ranges from 5:95 to 60:40.

9. The composition of claim 8, wherein the weight ratio of 1,2,6-hexanetriol to triethanol amine is from 1:19 to 19:1.

10. The composition of claim 9, wherein the triethanol amine and 1,2,6-hexanetriol comprise from 24 to 30% by weight of the amylosic material composition.

11. The composition of claim 10, wherein the weight ratio of 1,2,6-hexanetriol to triethanol amine is from 8:1 to 1:3.

12. The composition of claim 2, wherein the amylosic material is the separated fraction of whole starch.

13. The article of claim 4, wherein the weight ratio of 1,2,6-hexanetriol to triethanol amine is from 1:19 to 19:1.

14. The article of claim 4, wherein the weight ratio of triethanol amine and 1,2,6-hexanetriol to amylosic material is from 5:95 to 60:40.

15. The article of claim 4, wherein the weight ratio of 1,2,6-hexanetriol to triethanol amine is from 8:1 to 1:3 and said 1,2,6-hexanetriol and triethanol amine comprise at least 24% by weight of the amylosic film.

16. The article of claim 15, wherein the amylopectin content of said amylosic material is less than 20% by weight.

17. The article of claim 15, wherein the amylosic material is the separated fraction of whole starch.

18. The composition of claim 4 wherein the weight ratio of triethanol amine to 1,2,6-hexanetriol is from 1:19 to 19:1.

References Cited by the Examiner
UNITED STATES PATENTS

| | | | |
|---|---|---|---|
| 2,137,168 | 11/1938 | Levey | 106—210 |
| 2,550,213 | 4/1951 | Young | 106—210 |
| 2,594,273 | 4/1952 | Mellwig | 106—210 |

ALEXANDER H. BRODMERKEL, *Primary Examiner.*

D. J. ARNOLD, *Assistant Examiner.*